US008768758B2

(12) United States Patent
Chow

(10) Patent No.: US 8,768,758 B2
(45) Date of Patent: Jul. 1, 2014

(54) SYSTEM AND METHOD FOR FACILITATING THE HOME VIEWING OF FIRST-RUN MOVIES

(76) Inventor: Jeff Chow, Upper Marlboro, MD (US)

( * ) Notice: Subject to any disclaimer, the term of this patent is extended or adjusted under 35 U.S.C. 154(b) by 1052 days.

(21) Appl. No.: 12/581,356

(22) Filed: Oct. 19, 2009

(65) Prior Publication Data
US 2011/0093319 A1   Apr. 21, 2011

(51) Int. Cl.
G06Q 30/00    (2012.01)
(52) U.S. Cl.
USPC ........................................................ 705/14.1
(58) Field of Classification Search
USPC ................................................................ 705/14
See application file for complete search history.

(56) References Cited

U.S. PATENT DOCUMENTS

| | | | | |
|---|---|---|---|---|
| 7,924,395 B2* | 4/2011 | Moore et al. | ..................... | 352/40 |
| 2001/0029583 A1* | 10/2001 | Palatov et al. | ................ | 713/193 |
| 2002/0095680 A1* | 7/2002 | Davidson | ........................ | 725/87 |
| 2002/0198958 A1* | 12/2002 | Frenkiel et al. | ............... | 709/217 |
| 2004/0064377 A1* | 4/2004 | Ergo et al. | ........................ | 705/26 |
| 2004/0186783 A1* | 9/2004 | Knight et al. | .................... | 705/16 |
| 2004/0260605 A1* | 12/2004 | McIntyre et al. | ............... | 705/14 |
| 2004/0268386 A1* | 12/2004 | Logan et al. | .................... | 725/34 |
| 2005/0187885 A1* | 8/2005 | Allen et al. | .................... | 705/401 |
| 2006/0059039 A1* | 3/2006 | Patton et al. | .................... | 705/14 |
| 2006/0155599 A1* | 7/2006 | Chow | .............................. | 705/14 |
| 2006/0161474 A1* | 7/2006 | Diamond et al. | ............... | 705/14 |
| 2006/0258289 A1* | 11/2006 | Dua | ............................. | 455/41.3 |
| 2007/0149125 A1* | 6/2007 | Bremner et al. | ............. | 455/41.2 |
| 2007/0174140 A1* | 7/2007 | Noonan et al. | .................. | 705/27 |
| 2007/0212468 A1* | 9/2007 | White et al. | .................. | 426/590 |
| 2007/0250447 A1* | 10/2007 | Van Gassel et al. | ............ | 705/57 |
| 2007/0282747 A1* | 12/2007 | Shen et al. | ...................... | 705/51 |
| 2008/0071834 A1* | 3/2008 | Bishop | ....................... | 707/104.1 |
| 2008/0103974 A1* | 5/2008 | Fridhendler et al. | ............ | 705/52 |
| 2008/0154722 A1* | 6/2008 | Galinos | ........................... | 705/14 |
| 2008/0250120 A1* | 10/2008 | Mick et al. | .................... | 709/219 |
| 2009/0064302 A1* | 3/2009 | Colella | ............................. | 726/9 |
| 2009/0113116 A1* | 4/2009 | Thompson et al. | ........... | 711/103 |
| 2009/0119216 A1* | 5/2009 | Dalla Valle | ...................... | 705/59 |
| 2011/0093362 A1* | 4/2011 | Boston | .......................... | 705/27.1 |
| 2011/0208574 A1* | 8/2011 | Hinojosa et al. | ........... | 705/14.23 |
| 2011/0216640 A1* | 9/2011 | Curtis | ............................ | 369/100 |
| 2011/0321070 A1* | 12/2011 | Robert Chan | ..................... | 725/5 |
| 2013/0304592 A1* | 11/2013 | Willson | ........................... | 705/17 |

* cited by examiner

Primary Examiner — Matthew L Hamilton
(74) Attorney, Agent, or Firm — Pillsbury Winthrop Shaw Pittman LLP

(57) ABSTRACT

The home viewing of movies currently being shown in one or more theaters is facilitated. Facilitating home viewing of first-run, feature length movies may increase the amount of money earned during the theatre run of the movies. For example, this may enable users that would not be able to view movies in the theatre, and/or that would not be willing to view at least some of the movies in the theatre, to purchase the ability to view the movies.

6 Claims, 1 Drawing Sheet

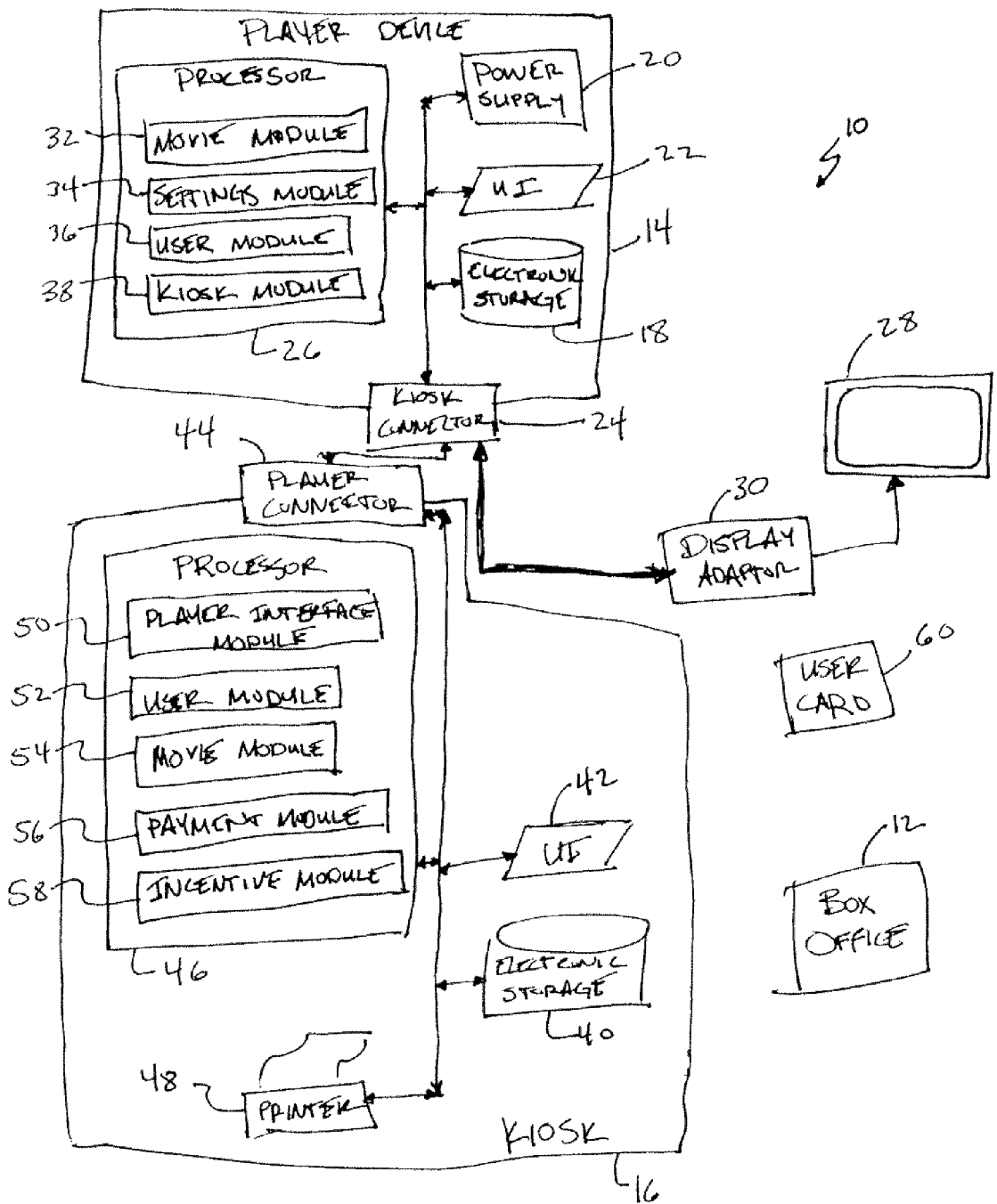

SYSTEM AND METHOD FOR FACILITATING THE HOME VIEWING OF FIRST-RUN MOVIES

FIELD OF THE INVENTION

The invention relates to distributing first-run movies currently being shown in theatres for home viewing via a personal media player device that is dockable with a kiosk to pay for and obtain copies of first-run movies that can be viewed from the personal media player, but which may not be accessible to consumers outside of the player device.

BACKGROUND OF THE INVENTION

Consumers who want to see a movie currently being shown at a movie theater but who are unable to see the movie at the theater for various reasons, such as a tight schedule, may have to wait until the movie is available on DVD discs, typically sometime after the movie has finished playing in local theaters. Likewise, parents are now unable to prescreen movies currently playing at movie theaters before permitting their children to see a movie in the theater without buying a ticket and actually attending a showing of the movies.

In order to view a movie that is currently being shown in theaters (a "first-run movie"), consumers may obtain unauthorized, illegal, bootleg copies of the movie. These bootleg copies typically have low picture clarity. Purchasing bootlegs also exposes consumers to fraud, as some alleged movie copies may simply be blank DVDs.

SUMMARY

One aspect of the invention relates to facilitate home viewing of movies currently being shown in one or more theaters. Facilitating home viewing of first-run, feature length movies may increase the amount of money earned during the theatre run of the movies. For example, this may enable users that would not be able to view movies in the theatre, and/or that would not be willing to view at least some of the movies in the theatre, to purchase the ability to view the movies.

In some implementations, a system configured to facilitate home viewing of movies currently being shown in one or more theatres may include one or more of a player device, a kiosk, and/or other components. The player device may be associated with a user, or group of users (e.g., a household or other group of users). The player device may be configured to dock with the kiosk to download movies currently playing at a theatre associated with the kiosk. The connection implemented by the player device to dock with the kiosk may be a proprietary connector that is not available to consumers to connect with player device with a consumer computing platform (e.g., a personal computer, and/or other consumer computing platforms). This may reduce unauthorized copying and/or distribution of movie downloaded to the player device. In conjunction with this hardware safeguard, the kiosk, the player device, and/or the movie video files transferred from the kiosk to the player may be safeguarded by one or more other forms of digital rights management safeguards to ensure that the movie video files cannot be transferred from the player device to another consumer computing platform.

The player device may be personal media player configured to pull movie video files associated with first-run movies from the kiosk over the proprietary physical link, and not from a consumer computing platform. The hardware, software, and/or firmware of the player device may be configured such that first-run movies pulled from the kiosk may not be accessible to other devices (e.g., consumer computing platforms) from the player device. This may keep a user from purchasing the right to view a movie from the kiosk, and then copy and/or redistribute the movie without permission or legal right. In some implementations, the player device may include one or more of electronic storage, a power supply, a user interface, a kiosk communication connector, a processor, and/or other components.

The electronic storage may comprise electronic storage media that electronically stores information, including movie video files transferred from the kiosk to the player device. By way of non-limiting example, the electronic storage may include non-removable flash memory based around the compact flash-card specification. This may enable faster information transfer rates with the kiosk to reduce upload time from the kiosk to player the device. Information stored to the electronic storage may be formatted to allow adequate room for the digital movie video files and bonus material associated with movies (e.g., trailers, deleted scenes, features, and/or other bonus materials).

The user interface may be configured to provide an interface between the player device and the user through which the user may provide information to and receive information from the player device. This information may include control inputs and/or movie video and/or audio.

In some implementations, the user interface may be configured to present movies to the user via a television, a monitor, and/or other electronic displays external to the player device (and/or associated external speakers). To facilitate the presentation of movies to the user via an external electronic display, the player device may include a wireless transmitter configured to transmit signals to the electronic display conveying a movie to be displayed. For example, the wireless transmitter may be configured to transmit movie information via a wireless protocol such as Digital Living Network Alliance ("DLNA"), and/or other wireless protocols.

In some implementations, the electronic display and/or the player device may not be capable of wireless communication enabling the transfer of movie information from the player device to the electronic display for display thereon. In such implementations, a display adaptor may be configured to connect the player device with the electronic display for communication of movie information from the player device to the electronic display. For example, the player device may "dock" to the display adaptor in the same fashion it does with the kiosk (e.g., via the kiosk communication connector). The display adaptor may lack the data-layer required to copy and/or transmit digital movie files to enable a user to gain access to movies outside of the player device.

The kiosk communication connector may be configured to connect the player device with the kiosk. The player device may "dock" directly with the kiosk communication connector. The exterior of the player device at or near the kiosk communication connector may be shaped to interface with the exterior of the kiosk.

The kiosk communication connector may be a proprietary connector. This may prevent the player device from being connected with a consumer computing platform, which may discourage unauthorized copying and/or transfer of movie video files. The proprietary connector may, however, be implemented to conform with a conventional bus standard, such as USB 3.0, and/or other bus standards.

The processor may be configured to provide information processing capabilities in the player device. The processor 26 may be configured to execute one or more computer program modules. The one or more computer program modules may include one or more of a movie module, a settings module, a user module, a kiosk module, and/or other modules.

The movie module may be configured to playback and delete downloaded movies in accordance with control inputs received from a user via the user interface. The movie module may be configured to maintain a history of previously viewed titles and/or to organize user ratings of previously viewed titles (e.g., to facilitate directed marketing, and/or viewing suggestions). The movie module may be configured to password lock movies of a certain rating according to the MPAA scale.

The setting module may be configured to manage settings of the player device. For example, the settings module may be configured to manage customizations such as automatic screen lock timer, display brightness, sound lock-out levels to limit the maximum sound level when using headphones, and/or other user-selectable settings.

The user module may be configured to manage user profiles associated with different users that have access to the player device. For example, individual users that have access to the player device may have different settings preferences (e.g., as managed by the settings module), may have access to different levels of content (e.g., restrictions based on parental controls), may be linked to different payment accounts and/or methods, and/or have other settings, controls, and/or accesses that are customized on a per-user basis. The user module may manage user profiles for individual users that provide the individual users a customized experience. The user module may implement a user profile associated with a user currently using the player device based on, for example, user information provided to the player device by the user. The user information may be manually input by the user (e.g., login, password, and/or other user information), the user information may be read from an electronically readable medium provided by the user (e.g., a card with a magnetic strip and/or a radio frequency ID transmitter, and/or other electronically readable media), and/or otherwise provided to the player device to identify the user.

The kiosk module may be configured to interface the player device with the kiosk. As such, the kiosk module may be configured to format information for transmission to the kiosk, decode information received from the kiosk, and/or otherwise enable communication between the player device and the kiosk. The information communicated between the player device and the kiosk by the kiosk module may include user inputs, user information, movie video files, and/or other information.

The kiosk may be configured to enable users to obtain electronic copies of first-run movies on the player device. In some implementations, the kiosk may include one or more of electronic storage, a user interface, a player connector, a processor, a printer, and/or other components.

The user interface may be configured to provide an interface between the kiosk and the user through which the user may provide information to and receive information from the kiosk. For example, via the user interface, the user may input selections of movies to be downloaded to the player device. In some implementations, the user interface may include a card reader (e.g., a magnetic strip reader, an optical code reader, an RFID reader, and/or other card readers). Via the card reader, the user may input payment information, user identification information, and/or other information.

The player connector may be configured to connect with the kiosk communication connector of the player device. When the player connector is connected with the kiosk communication connector, the connection between the player connector and the kiosk communication connector places the kiosk in communication with the player device. In some implementations, the player connector and/or the exterior of the kiosk may be configured to enable the player device to be "docked" to the kiosk when the player connector and the kiosk communication connector are connected.

The processor may be configured to provide information processing capabilities in the kiosk. The processor may be configured to execute one or more computer program modules. The one or more computer program modules may include one or more of a player interface module, a user module, a movie module, a payment module, an incentive module, and/or other modules.

The player interface module may be configured to establish a communication interface with the player device over the connection between the player connector and the kiosk communication connector. As such, the player interface module may be configured to format information for transmission to the player device, decode information received from the player device, and/or otherwise enable communication between the kiosk and the player device. The information communicated between the player device and the kiosk by the player interface module may include user inputs, user information, movie video files, and/or other information.

The user module may be configured to manage user profiles associated with different users that dock player devices at the kiosk. For example, individual users that dock player devices to the kiosk may have access to different levels of content (e.g., restrictions based on parental controls), may be linked to different payment accounts and/or methods, and/or have other settings, controls, and/or accesses that are customized on a per-user basis. The user module may manage user profiles for individual users that provide the individual users a customized experience.

The user module may implement a user profile associated with a user currently using the player device (while the player device is docked with the kiosk) based on user information that identifies the user. The user information may be manually input by the user (e.g., login, password, and/or other user information) via the user interface, the user information may be read from an electronically readable medium provided by the user (e.g., a card with a magnetic strip and/or a radio frequency ID transmitter, and/or other electronically readable media), the user information may be obtained from the player device, and/or the user information may otherwise provided to the kiosk to identify the user.

By way of non-limiting example, upon docking the player device to the kiosk, the user module may obtain information from the player device that identifies the specific player device and/or the user currently using the player device. The user may be prompted to enter user information directly to the kiosk to identify the specific user, or to confirm or refine an identification of the user made based on the information received from the player device. For instance, the user may be prompted to present a user card that stores user information to a card reader associated with the user interface. From the user information obtained by the user interface from the card, the user module may identify the user and/or a user profile associated with the user. The interaction of the user with the system may be customized based on the settings within the user interface.

The movie module may be configured to enable the user to select movies for download from the kiosk to the player device. This may include providing a searchable set of first-run movie titles to the user via the user interface. Movies with content and/or ratings that are not authorized by the user profile of the user, may be represented as not being available for download by the user, or may not be shown at all. In some implementations, the movie module may present movie suggestions to the user. The suggestions may be based, for example, on past movie viewing habits of the user (e.g., obtained from a viewing history stored in the user profile associated with the user). Upon selection of one or more movies by the user, the movie module may manage the transmission of the movie video file(s) associated with the selected movie(s) to the player device.

The movie module may enable the user to configure various settings related to the movie. For example, such settings may include an aspect ratio (e.g., 4:3, 16:9, etc.), an inclusion of subtitles (e.g., for hearing impaired and/or non-English speaking users), an alternative voice track (e.g., for non-English speaking users), and/or other settings. It will be appreciated that in some instances, one or more of these settings may be configured by the user on the player device in conjunction with, or instead of, the adjustment via the kiosk made possible by the movie module.

Upon selection by the user of one or more movies for download, the payment module may be configured to obtain payment from the user for the movie(s). Such payment may include pre-purchased movie credits, if any are available in the user's user profile, payment via a credit card, debit card, and/or pre-paid card (as presented to a card reader associated with the user interface), payment via debit to a financial account previously linked with the user's user profile (e.g., a bank account, a credit account, and/or other payment accounts), and/or other forms of payment. For example, the kiosk may be linked with a theatre box office such that the user can purchase movie credits for his user account at the box office, and then use such movie credits for payment at the kiosk.

The incentive module may be configured to provide incentives to the user. The incentives may include free and/or discounted downloads, free and/or discounted tickets to attend movies, and/or other incentives. For example, movies that are toward the end of their run in the theatre, and/or movies that have just left the theatre may be made available to the user for free and/or at reduced prices.

As will be appreciated, if the price of a movie download to the player device is approximately the same as the price of one or more tickets to see the movie, a theatre box office may still make less money from movie downloads because of the concessions profits made from physical attendees. The incentive module may be configured to provide to the user a free (or reduced price) ticket to see movies that are downloaded to the player device. In some cases, this may enable a parent to screen a movie, and then obtain a ticket for a child to attend the movie at less cost than if the parent were to purchase a separate ticket to view the movie. The free and/or reduced price tickets may enable the box office to recoup lost profits in the form of concessions, and may incent the user to purchase more downloaded movies.

The printer may be configured to print receipts for the user. As such, the printer 48 may include a thermal receipt printer. The receipts may provide a proof of purchase for the user. The receipts may include written proof of an incentive received by the user (e.g., for a free and/or discounted ticket).

In some implementations, rather than printing out receipts and/or incentives, such information may be provided to the user by associating the receipt and/or the incentives with the user card. To receive an incentive, or to provide proof of purchase, the user may present the user card to, for example, the box office.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates a system configured to facilitate home viewing of movies currently being shown in a movie theatre, in accordance with one or more embodiments of the invention.

DETAILED DESCRIPTION

FIG. 1 illustrates a system 10 configured to facilitate home viewing of movies currently being shown in one or more theaters associated with a box office 12. Facilitating home viewing of first-run, feature length movies may increase the amount of money earned during the theatre run of the movies. For example, this may enable users that would not be able to view movies in the theatre, and/or that would not be willing to view at least some of the movies in the theatre, to purchase the ability to view the movies. In some implementations, system 10 may include one or more of a player device 14, a kiosk 16, and/or other components.

The player device 14 may be a personal media player configured to pull video files associated with first-run movies from kiosk 16 over a proprietary physical link, and not from a consumer computing platform (e.g., a personal computer, and/or other consumer computing platforms). The hardware, software, and/or firmware of player device 14 may be configured such that first-run movies pulled from kiosk 16 may not be accessible to other devices (e.g., consumer computing platforms) from player device 14. This may keep a user from purchasing the right to view a movie from kiosk 16, and then copy and/or redistribute the movie without permission or legal right. In some implementations, player device 14 includes one or more of electronic storage 18, a power supply 20, a user interface 22, a kiosk communication connector 24, a processor 26, and/or other components.

The electronic storage 18 may comprise electronic storage media that electronically stores information. The electronic storage media of electronic storage 18 may include one or both of system storage that is provided integrally (i.e., substantially non-removable) with player device 14. Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 26, information received via user interface 22, movie video files, and/or other information that enables player device 14 to function properly.

By way of non-limiting example, example, electronic storage 18 may include non-removable flash memory based around the compact flash-card specification. This may enable faster information transfer rates with kiosk 16 to reduce upload time from kiosk 16 to player device 14. Information stored to electronic storage 18 may be formatted to allow adequate room for the digital video files and bonus material associated with movies.

The power supply 20 may be configured to provide power to the components of player device 14. The power supply 20 may be rechargeable. For example, power supply 20 may include one or more of a battery, a capacitor, a super-capacitor, and/or other power supplies. In some implementations, power supply 20 may be sufficient to power player device 14 for at least 4 continuous hours of movie playback. For instance, power supply 20 may include a 2800Mah Li-Ion battery.

The user interface 22 may be configured to provide an interface between player device 14 and the user through which the user may provide information to and receive information from player device 14. This enables data, movies, and/or instructions and any other communicable items, collectively referred to as "information," to be communicated between the user and player device 14. Examples of interface devices suitable for inclusion in user interface 22 include a keypad, buttons, switches, a keyboard, knobs, levers, a display screen, a touch screen, speakers, a microphone, an indicator light, an audible alarm, a printer, a headphone jack, a card reader (e.g., magnetic strip reader, optical code reader, RFID reader, and/or other card readers) and/or other interface devices.

The user interface 22 may be configured to present movies to the user via a television, a monitor, and/or other electronic displays external to player device 14 (and associated external speakers). To facilitate the presentation of movies to the user via an external electronic display 28, player device 14 may include a wireless transmitter configured to transmit signals to electronic display 28 conveying a movie to be displayed. For example, the wireless transmitter may be configured to transmit movie information via a wireless protocol such as DLNA, and/or other wireless protocols.

In some implementations, electronic display 28 and/or player device 14 may not be capable of wireless communication enabling the transfer of movie information from player device 14 to electronic display 28 for display thereon. In such implementations, system 10 may include a display adaptor 30 configured to connect player device 14 with electronic display 28 for communication of movie information from player device 14 to electronic display 28. For example, player device 14 may "dock" to display adaptor 30 in the same fashion it does with kiosk 16 (e.g., via kiosk communication connector 24). The display adaptor 30 may lack the data-layer required to copy and/or transmit digital movie files to enable a user to gain access to movies outside of player device 14. The display adaptor 30 may provide power to player device 14 to charge power supply 20 while player device 14 is connected to display adaptor 30. The display adaptor 30 may include a remote control that enables remote control of player device 14 during movie playback.

The kiosk communication connector 24 may be configured to connect player device 14 with kiosk 16. The player device 14 may "dock" directly with kiosk 16 via kiosk communication connector 24. The exterior of player device 14 at or near kiosk communication connector 24 may be shaped to interface with the exterior of kiosk 16.

The kiosk communication connector 24 may be a proprietary connector. This may prevent player device 14 from being connected with a consumer computing platform, which may discourage unauthorized copying and/or transfer of movie video files. The proprietary connector may, however, be implemented to conform with a conventional bus standard, such as USB 3.0, and/or other bus standards.

Processor 26 may be configured to provide information processing capabilities in player device 14. As such, processor 26 may include one or more of a digital processor, an analog processor, a digital circuit designed to process information, an analog circuit designed to process information, a state machine, and/or other mechanisms for electronically processing information. For example, processor 26 may include an embedded CPU, such as an NVIDIA Tegra 600 based processor running above 600 MHz, and/or other processors configured to decode HD videos. Although processor 26 is shown in FIG. 1 as a single entity, this is for illustrative purposes only. In some implementations, processor 26 may include a plurality of processing units.

As is shown in FIG. 1, processor 26 may be configured to execute one or more computer program modules. The one or more computer program modules may include one or more of a movie module 32, a settings module 34, a user module 36, a kiosk module 38, and/or other modules. Processor 26 may be configured to execute modules 32, 34, 36, and/or 38 by software; hardware; firmware; some combination of software, hardware, and/or firmware; and/or other mechanisms for configuring processing capabilities on processor 26.

It should be appreciated that although modules 32, 34, 36, and 38 are illustrated in FIG. 1 as being co-located within a single processing unit, in implementations in which processor 26 includes multiple processing units, one or more of modules 32, 34, 36, and/or 38 may be located remotely from the other modules. The description of the functionality provided by the different modules 32, 34, 36, and/or 38 described below is for illustrative purposes, and is not intended to be limiting, as any of modules 32, 34, 36, and/or 38 may provide more or less functionality than is described. For example, one or more of modules 32, 34, 36, and/or 38 may be eliminated, and some or all of its functionality may be provided by other ones of modules 32, 34, 36, and/or 38. As another example, processor 26 may be configured to execute one or more additional modules that may perform some or all of the functionality attributed below to one of modules 32, 34, 36, and/or 38.

The movie module 32 may be configured to playback and delete downloaded movies in accordance with control inputs received from a user via user interface 22. The movie module 32 may be configured to maintain a history of previously viewed titles and/or to organize user ratings of previously viewed titles (e.g., to facilitate directed marketing, and/or viewing suggestions). The movie module 32 may be configured to password lock movies of a certain rating according to the MPAA scale.

The setting module 34 may be configured to manage settings of player device 14. For example, settings module 34 may be configured to manage customizations such as automatic screen lock timer, display brightness, sound lock-out levels to limit the maximum sound level when using headphones, and/or other user-selectable settings.

The user module 36 may be configured to manage user profiles associated with different users that have access to player device 14. For example, individual users that have access to player device 14 may have different settings preferences (e.g., as managed by settings module 34), may have access to different levels of content (e.g., restrictions based on parental controls), may be linked to different payment accounts and/or methods, and/or have other settings, controls, and/or accesses that are customized on a per-user basis. The user module 36 may manage user profiles for individual users that provide the individual users a customized experience. User module 34 may implement a user profile associated with a user currently using player device 14 based on, for example, user information provided to player device 14 by the user. The user information may be manually input by the user (e.g., login, password, and/or other user information), the user information may be read from an electronically readable medium provided by the user (e.g., a card with a magnetic strip and/or a radio frequency ID transmitter, and/or other electronically readable media), and/or otherwise provided to player device 14 to identify the user.

The kiosk module 38 may be configured to interface player device 14 with kiosk 16. As such, kiosk module 38 may be configured to format information for transmission to kiosk 16, decode information received from kiosk 16, and/or otherwise enable communication between player device 14 and kiosk 16. The information communicated between player device 14 and kiosk 16 by kiosk module 38 may include user inputs, user information, movie video files, and/or other information.

The kiosk 16 may be configured to enable users to obtain electronic copies of first-run movies on player device 14. In some implementations, kiosk 16 may include one or more of electronic storage 40, a user interface 42, a player connector 44, a processor 46, a printer 48, and/or other components.

The electronic storage 40 may comprise electronic storage media that electronically stores information. The electronic storage media of electronic storage 40 may include one or both of system storage that is provided integrally (i.e., substantially non-removable) with kiosk 16 and/or removable storage that is removably connectable to kiosk 16 via, for example, a port (e.g., a USB port, a firewire port, etc.) or a drive (e.g., a disk drive, etc.). Electronic storage 40 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 40 may store software algorithms, information determined by processor 46, information received via user interface 42, and/or other information that enables kiosk 16 to function properly. Electronic storage 40 may be a separate component within kiosk 16, or electronic storage 40 may be provided integrally with one or more other components of kiosk 16.

The user interface 42 may be configured to provide an interface between kiosk 16 and the user through which the user may provide information to and receive information from kiosk 16. This enables data, movies, and/or instructions and any other communicable items, collectively referred to as "information," to be communicated between the user and kiosk 16. Examples of interface devices suitable for inclusion in user interface 42 include a keypad, buttons, switches, a keyboard, knobs, levers, a display screen, a touch screen, speakers, a microphone, an indicator light, an audible alarm, a printer, a card reader (e.g., magnetic strip reader, optical code reader, RFID reader, and/or other card readers) and/or other interface devices. In some implementations, some or all of the functionality attributed herein to user interface 42 may be provided by user interface 22 of player device 14 while player device 14 is docked with kiosk 16.

The player connector 44 may be configured to connect with kiosk communication connector 24 of player device 14. When player connector 44 is connected with kiosk communication connector 24, the connection between player connector 44 and kiosk communication connector 24 places kiosk 16 in communication with player device 14. In some implementations, player connector 44 and/or the exterior of kiosk 16 may be configured to enable player device 14 to be "docked" to kiosk 16 when player connector 44 and kiosk communication connector 24 are connected.

Processor 46 may be configured to provide information processing capabilities in kiosk 16. As such, processor 46 may include one or more of a digital processor, an analog processor, a digital circuit designed to process information, an analog circuit designed to process information, a state machine, and/or other mechanisms for electronically processing information. Although processor 46 is shown in FIG. 1 as a single entity, this is for illustrative purposes only. In some implementations, processor 46 may include a plurality of processing units.

As is shown in FIG. 1, processor 46 may be configured to execute one or more computer program modules. The one or more computer program modules may include one or more of a player interface module 50, a user module 52, a movie module 54, a payment module 56, an incentive module 58, and/or other modules. Processor 26 may be configured to execute modules 50, 52, 54, 56, and/or 58 by software; hardware; firmware; some combination of software, hardware, and/or firmware; and/or other mechanisms for configuring processing capabilities on processor 46.

It should be appreciated that although modules 50, 52, 54, 56, and 58 are illustrated in FIG. 1 as being co-located within a single processing unit, in implementations in which processor 46 includes multiple processing units, one or more of modules 50, 52, 54, 56, and/or 58 may be located remotely from the other modules. The description of the functionality provided by the different modules 50, 52, 54, 56, and/or 58 described below is for illustrative purposes, and is not intended to be limiting, as any of modules 50, 52, 54, 56, and/or 58 may provide more or less functionality than is described. For example, one or more of modules 50, 52, 54, 56, and/or 58 may be eliminated, and some or all of its functionality may be provided by other ones of modules 50, 52, 54, 56, and/or 58. As another example, processor 46 may be configured to execute one or more additional modules that may perform some or all of the functionality attributed below to one of modules 50, 52, 54, 56, and/or 58.

The player interface module 50 may be configured to establish a communication interface with player device 14 over the connection between player connector 44 and kiosk communication connector 24. As such, player interface module 50 may be configured to format information for transmission to player device 14, decode information received from player device 14, and/or otherwise enable communication between kiosk 16 and player device 14. The information communicated between player device 14 and kiosk 16 by player interface module 50 may include user inputs, user information, movie video files, and/or other information.

The user module 52 may be configured to manage user profiles associated with different users that dock player devices at kiosk 16. For example, individual users that dock player devices to kiosk 16 may have access to different levels of content (e.g., restrictions based on parental controls), may be linked to different payment accounts and/or methods, and/or have other settings, controls, and/or accesses that are customized on a per-user basis. The user module 52 may manage user profiles for individual users that provide the individual users a customized experience.

The user module 52 may implement a user profile associated with a user currently using player device 14 (while player device 14 is docked with kiosk 16) based on user information that identifies the user. The user information may be manually input by the user (e.g., login, password, and/or other user information) via user interface 42, the user information may be read from an electronically readable medium provided by the user (e.g., a card with a magnetic strip and/or a radio frequency ID transmitter, and/or other electronically readable media), the user information may be obtained from player device 14, and/or the user information may otherwise provided to kiosk 16 to identify the user.

By way of non-limiting example, upon docking player device 14 to kiosk 16, user module 52 may obtain information from player device 14 that identifies the specific player device 14 and/or the user currently using player device 14. The user may be prompted to enter user information directly to kiosk 16 to identify the specific user, or to confirm or refine an identification of the user made based on the information received from player device 14. For instance, the user may be prompted to present a user card 60 that stores user information to a card reader associated with user interface 42. From the user information obtained by user interface 42 from the card, user module 52 may identify the user and/or a user profile associated with the user. The interaction of the user with system 10 may be customized based on the settings within the user interface.

The movie module 54 may be configured to enable the user to select movies for download from kiosk 16 to player device 14. This may include providing a searchable set of first-run movie titles to the user via user interface 42. Movies with content and/or ratings that are not authorized by the user profile of the user, may be represented as not being available for download by the user, or may not be shown at all. In some implementations, movie module 54 may present movie suggestions to the user. The suggestions may be based, for example, on past movie viewing habits of the user (e.g., obtained from a viewing history stored in the user profile associated with the user). Upon selection of one or more movies by the user, movie module 54 may manage the transmission of the movie video file(s) associated with the selected movie(s) to the player device 14.

Upon selection by the user of one or more movies for download, payment module 56 may be configured to obtain payment from the user for the movie(s). Such payment may include pre-purchased movie credits, if any are available in the user's user profile, payment via a credit card, debit card, and/or pre-paid card (as presented to a card reader associated with user interface 42), payment via debit to a financial account previously linked with the user's user profile (e.g., a bank account, a credit account, and/or other payment accounts), and/or other forms of payment. For example, kiosk 16 may be linked with box office 12 such that the user can purchase movie credits for his user account at box office 12, and then use such movie credits for payment at kiosk 16.

The incentive module 58 may be configured to provide incentives to the user. The incentives may include free and/or discounted downloads, free and/or discounted tickets to attend movies, and/or other incentives. For example, movies that are toward the end of their run in the theatre, and/or movies that have just left the theatre may be made available to the user for free and/or at reduced prices.

As will be appreciated, if the price of a movie download to player device 14 is approximately the same as the price of one or more tickets to see the movie, box office 12 may still make less money from movie downloads because of the concessions profits made from physical attendees. The incentive module 58 may be configured to provide to the user a free (or reduced price) ticket to see movies that are downloaded to player device 14. In some cases, this may enable a parent to screen a movie, and then obtain a ticket for a child to attend the movie at less cost than if the parent were to purchase a separate ticket to view the movie. The free and/or reduced price tickets may enable box office 12 to recoup lost profits in the form of concessions, and may incent the user to purchase more downloaded movies.

The printer 48 may be configured to print receipts for the user. As such, printer 48 may include a thermal receipt printer. The receipts may provide a proof of purchase for the user. The receipts may include written proof of an incentive received by the user (e.g., for a free and/or discounted ticket).

In some implementations, rather than printing out receipts and/or incentives, such information may be provided to the user by associating the receipt and/or the incentives with user card 60. To receive an incentive, or to provide proof of purchase, the user may present user card 60 to, for example, box office 12.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to facilitate home viewing of first-run movies that are currently being shown in one or more movie theatres, the system comprising:
   a kiosk comprising a processor and a user interface, wherein the kiosk is configured to removably connect to a player device, the player device being associated with a user, wherein the kiosk is further configured to receive from the user, through the user interface, a selection of a first-run movie, the first-run movie being currently shown in one or more movie theatres;
   wherein the kiosk is further configured to obtain payment for provision of one or more movie video files, wherein the one or more movie video files are associated with the selected first-run movie;
   wherein the kiosk is further configured to electronically transfer the one or more movie video files to the player device responsive to obtaining the payment; and
   wherein the kiosk is further configured such that responsive to obtaining the payment, the kiosk issues an incentive to the user that enables the user to obtain a ticket to view the selected first-run movie in a movie theatre at a reduced price.

2. The system of claim 1, wherein the reduced price is free.

3. The system of claim 1, wherein the kiosk further comprises a reader configured to read user information associated with the user from an electronically readable medium presented by the user; and
   wherein the kiosk is further configured to restrict first-run movies from availability for user selection through the user interface as the selected first-run movie based on the user information.

4. A method of facilitating home viewing of first-run movies that are currently being shown in one or more movie theatres, the method comprising:
   storing a plurality of first-run movies currently being shown in one or more theatres to electronic storage associated with a kiosk;
   receiving, by the kiosk, a removable connection at the kiosk with a player device;

receiving, by the kiosk, a selection by a user of a first-run movie, wherein the selected first-run movie is currently being shown in one or more movie theatres;

obtaining, by the kiosk, payment for provision of one or more movie video files, wherein the one or more movie video files are associated with the selected first-run movie;

responsive to obtaining the payment:
   determining, by the kiosk, that the one or more movie video files should be transferred to the player device;
   transferring the one or more movie video files from the kiosk to the player device, thereby enabling the user to view the selected first-run movie via the player device; and
   issuing an incentive to the user that enables the user to obtain a ticket to view the selected first-run movie in a movie theatre at a reduced price.

5. The method of claim 4, wherein the reduced price is free.

6. The method of claim 4, further comprising:

reading, by the kiosk, from an electronically readable medium presented by the user, user information associated with the user; and restricting first-run movies from availability for user selection through user interface based on the user information.

\* \* \* \* \*